(12) United States Patent
Grisley

(10) Patent No.: US 7,507,060 B2
(45) Date of Patent: Mar. 24, 2009

(54) APPARATUSES FOR SUPPORTING CUTTING TOOLS

(76) Inventor: Kenneth M. Grisley, 1419 Magnolia Pl., Port Coquitlam, Brish Columbia (CA) V3H 4S8

( * ) Notice: Subject to any disclaimer, the term of this patent is extended or adjusted under 35 U.S.C. 154(b) by 0 days.

(21) Appl. No.: 11/942,119

(22) Filed: Nov. 19, 2007

(65) Prior Publication Data

US 2008/0118318 A1    May 22, 2008

Related U.S. Application Data

(60) Provisional application No. 60/860,167, filed on Nov. 20, 2006.

(51) Int. Cl.
*B23C 1/20* (2006.01)
(52) U.S. Cl. .............. 409/137; 409/178; 409/130; 144/85; 144/82; 144/144.1; 144/144.52; 144/252.1
(58) Field of Classification Search ......... 409/137, 409/182, 178, 179, 130; 408/58, 67; 144/252.1, 144/251.1, 251.2, 251.3, 85, 372, 145.1, 144/144.1, 134.1, 144.51, 144.52, 286.1, 144/286.5, 72–73, 82, 83, 70, 75, 76, 87
See application file for complete search history.

(56) References Cited

U.S. PATENT DOCUMENTS

| | | | | |
|---|---|---|---|---|
| 3,022,806 | A | * | 2/1962 | Johnston ................ 144/252.1 |
| 3,232,327 | A | * | 2/1966 | Barancyzk ................ 144/85 |
| 3,259,021 | A | * | 7/1966 | Appleton ................ 409/124 |
| 3,450,001 | A | * | 6/1969 | Fortune ................ 409/130 |
| 4,428,408 | A | | 1/1984 | Grisley |
| 4,630,656 | A | * | 12/1986 | Collins ................ 409/182 |
| 4,750,536 | A | | 6/1988 | Grisley |
| 5,711,356 | A | | 1/1998 | Grisley |
| 5,832,977 | A | * | 11/1998 | Hampton ................ 144/144.51 |
| 6,032,706 | A | | 3/2000 | Lear |
| 6,042,311 | A | * | 3/2000 | Yokoyama et al. .......... 409/138 |
| 6,422,276 | B1 | * | 7/2002 | Kevan ................ 144/144.1 |
| 6,755,597 | B2 | * | 6/2004 | Bergner et al. ............. 409/178 |
| 7,195,043 | B1 | * | 3/2007 | Neff ................ 409/178 |
| 2002/0168241 | A1 | * | 11/2002 | David et al. ................ 409/178 |
| 2003/0233922 | A1 | * | 12/2003 | Makropoulos ............... 83/574 |
| 2004/0081524 | A1 | * | 4/2004 | Barnett ................ 409/132 |
| 2005/0145299 | A1 | * | 7/2005 | Chang ................ 144/82 |

(Continued)

FOREIGN PATENT DOCUMENTS

EP    0807009    8/1996

(Continued)

OTHER PUBLICATIONS

Leigh Industries Instruction Manual—Leigh Dovetail Jig—Model D-1258, Oct. 1984.

(Continued)

*Primary Examiner*—Erica E Cadugan
(74) *Attorney, Agent, or Firm*—Kilpatrick Stockton LLP

(57) ABSTRACT

Embodiments of the present invention may include a cutting tool support that may provide supplemental support to a cutting tool when used with a cutting guide. In some embodiments, the cutting tool support may also include a dust collector that moves along the cutting tool support along with the cutting tool.

15 Claims, 7 Drawing Sheets

U.S. PATENT DOCUMENTS

2006/0021676 A1* 2/2006 McDaniel et al. ........ 144/144.1
2008/0185072 A1* 8/2008 Becker et al. ............ 144/144.1

FOREIGN PATENT DOCUMENTS

EP  1621303 A1  2/2006
GB  2367264 A   4/2002
WO  WO-96/23634  8/1996

OTHER PUBLICATIONS

Porter Cable 55160 16" Omnijig Features & Benefits, Feb. 2008.
Porter Cable Omnijig Accessories, Feb. 2008.
Combined Search and Examination Report for British Patent Application No. GB0722746.5 issued by the UK Patent Office on Mar. 10, 2008.

* cited by examiner

APPARATUSES FOR SUPPORTING CUTTING TOOLS

RELATED APPLICATIONS

This application relates to U.S. Provisional Ser. No. 60/860,167, filed Nov. 20, 2006 for "Various Attachments and Accessories For Use With Cutting Templates And Methods For Using The Same," the entire contents of which are hereby incorporated by this reference.

RELATED FIELDS

Embodiments of the present invention relate to apparatuses for at least partially supporting the movement of a cutting tool with respect to a cutting guide while keeping a dust collector proximate to the cutting tool as it moves.

BACKGROUND

Woodworking and other crafts often require the use of complex joinery techniques to join two or more work-pieces together. For instance, a woodworker might use one or more of mitered joints, finger joints, mortise-and-tenon joints, dovetail joints, or other types of joints to join two or more pieces of wood together. Many amateur and even professional craftsmen find it challenging, or at least time consuming, to accurately cut the elements in the work-pieces necessary for these joints.

Fortunately, cutting guides are available to help the craftsman accurately and (relatively) quickly cut many of these joints using power cutting tools. For instance, U.S. Pat. No. 4,428,408, issued Oct. 5, 1981 to Kenneth M. Grisley, discloses a dovetailing jig used to support and guide a router for cutting a variety of dovetail joints. In one embodiment, the dovetailing jig of the '408 patent includes a plurality of guide fingers, the sides of which interact with a bushing extending from the router's base to guide the movements of the router with respect to a work-piece. In use, a forward portion of the router's base rests on and is supported by top faces of the guide fingers. In some instances, the guide fingers may only be partially supporting the forward portion of the router base, and the craftsman may need to exercise caution to keep the router from tipping backwards during use. In some instances, it may be important to keep the router from tipping during use to ensure that the joint elements are accurately cut.

Similarly, U.S. Pat. No. 5,711,356, issued Jan. 27, 1998 to Mr. Grisley as well, discloses a finger joint template that includes a plurality of guide fingers that both guide the movement of a router while at the same time at least partially support forward portions of the router base. Again, in some embodiments of the '356 patent, it may be necessary to exercise caution to ensure that the router does not tip during use.

Another concern for woodworkers and other craftsmen is dust control. The use of power woodworking tools often creates a large amount of dust and debris, which can potentially be hazardous to the woodworker's health, and also a chore to clean-up. It is known to use vacuum devices to help collect the dust and debris created during woodworking, and it is known to use such vacuum devices with cutting guides. Many of these previous cutting guide/vacuum device combinations are inefficient, however, because previous cutting guides have not positioned the intake of the vacuum device proximate to the cutter of the cutting tool during use.

SUMMARY

Embodiments of the present invention may include apparatuses for providing support (in some embodiments, supplemental support) to a cutting tool when used with a cutting guide. In some embodiments, the support apparatus may also facilitate maintaining the intake of a vacuum device proximate to the cutter of the cutting tool during use.

The support apparatus may include an elongated stabilizer including a support surface, with at least a portion of the support surface at least partially supporting a cutting tool when used with a cutting guide. A moveable dust collector may be mounted to the stabilizer such that it moves along the stabilizer as the cutting tool moves along the stabilizer. The dust collector may be connected or otherwise associated with a vacuum system.

In some embodiments, the dust collector may include one or more arms extending therefrom that may at least temporarily interact with the cutting tool such that the dust collector will move in conjunction with the cutting tool. In one embodiment, the cutting tool rests in-between two of the arms, although the arms are not directly connected to the cutting tool, and an arm does not necessarily come into contact with the cutting tool until the cutting tool moves in the direction of that arm. The spacing between the two arms may be adjustable in some embodiments, to accommodate different sized cutting tools.

In some embodiments, the support apparatus may be mounted on the cutting guide in a removable fashion, such that the support apparatus can be quickly removed from the cutting guide when not in use if desired. In some of the embodiments, magnets (such as rare-earth magnets) associated with at least one of the support apparatus and the cutting guide may facilitate securing the support apparatus to the cutting guide in a removable manner. In other embodiments, however, the support apparatus may be mounted to the cutting guide in a more permanent manner, or may even be formed as an integral component of the cutting guide.

DETAILED DESCRIPTION OF DRAWINGS

Figure 1:
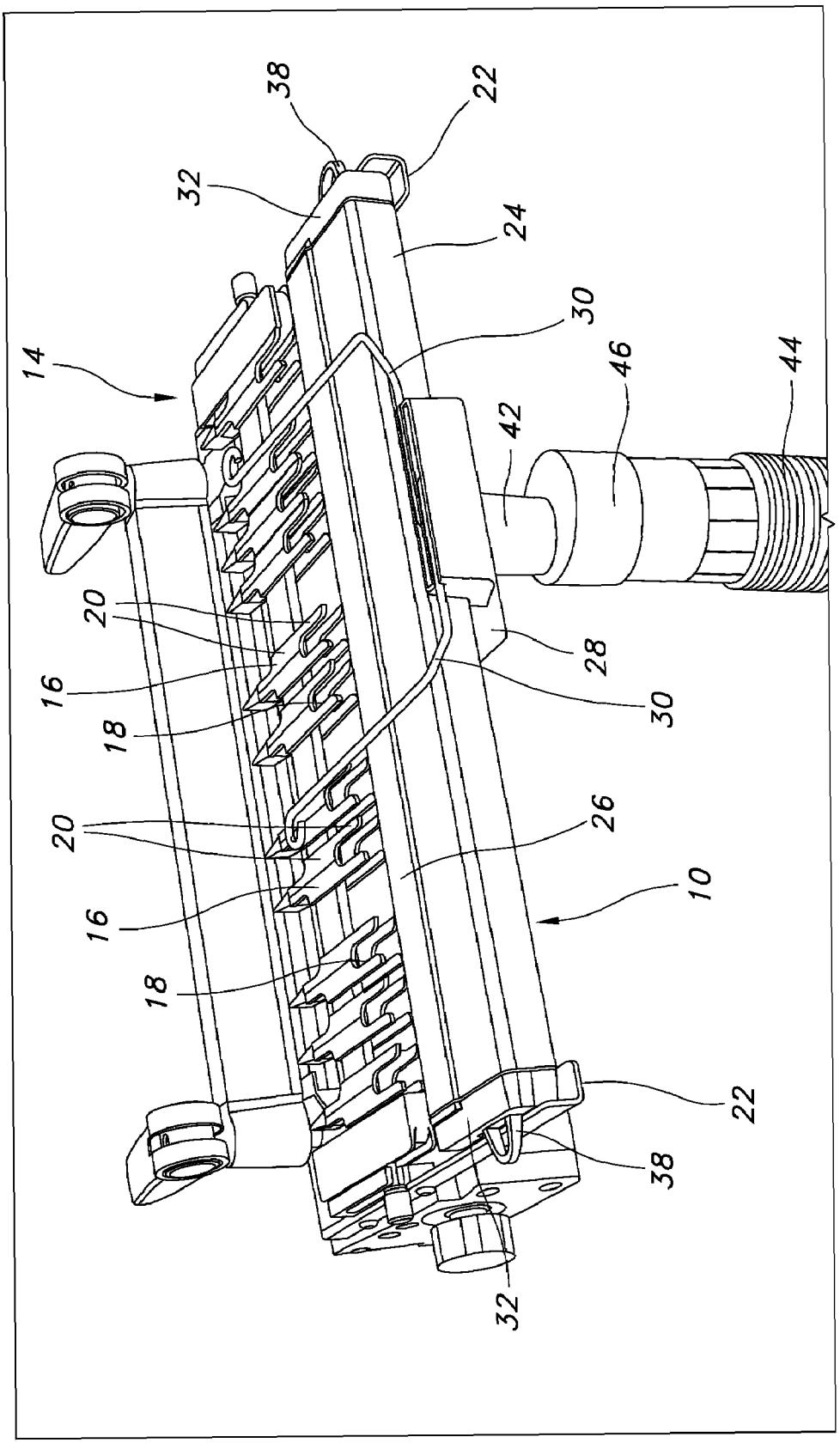
FIG. 1 shows a perspective view of a cutting tool support apparatus secured to a cutting guide.
Figure 2:
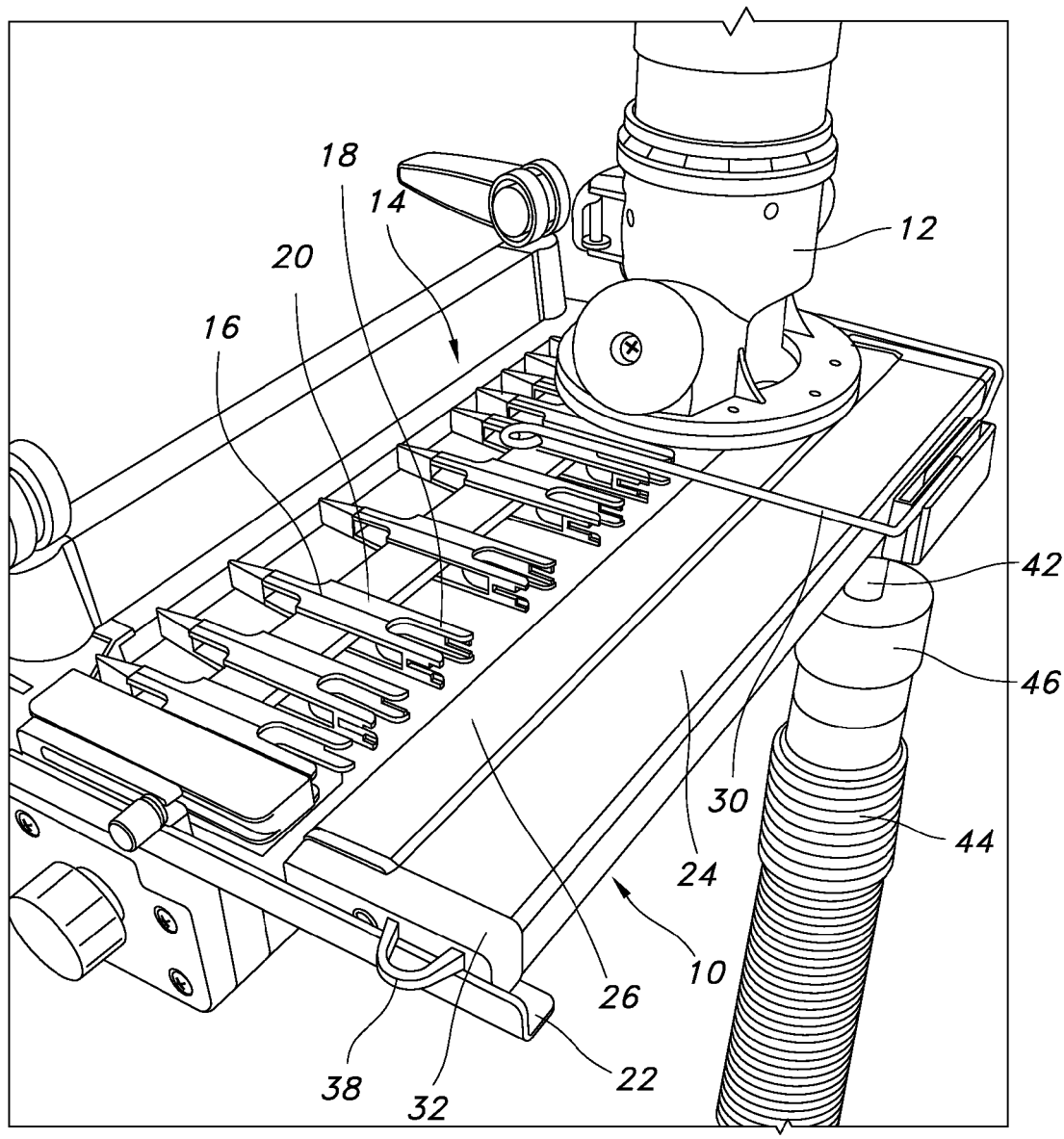
FIG. 2 shows another perspective view of the cutting tool support apparatus of FIG. 1, shown with a cutting tool resting thereon.

FIGS. 1 and 2 show one embodiment of a cutting tool support 10 for supporting the movement of a cutting tool 12 with respect to a cutting guide 14. Other cutting tool supports 10, however, are also possible and within the scope of the present invention.

The cutting guide 14 shown in FIGS. 1 and 2 is a dovetail jig that guides the movement of the cutting tool 12 (in the embodiment shown, a router) to form the pins and tails of a dovetail joint. The dovetail jig shown includes a number of adjustable guide fingers 16 that can be adjusted to create a wide variety of dovetail joints. The guide fingers 16 may include guide surfaces 18 that guide the movement of the cutting tool 12 with respect to a work-piece (not shown). In some embodiments, a bushing extending underneath the cutting tool 12 may interact with the guide surfaces 18 to guide the movements of the cutting tool 12.

The top surfaces of the guide fingers 16 shown in FIGS. 1 and 2 define support surfaces 20 on which a forward portion of the cutting tool 12 rests as it moves to cut the work-piece. As shown in FIG. 2, however, the support surfaces 20 of guide fingers 16 do not necessarily entirely support the cutting tool 12, and rear portions of the cutting tool do not necessarily always rest on the support surface 20.

The dovetail jig shown in FIGS. 1 and 2 is not the only type of cutting guide for which cutting tool supports of the present invention could be used. One could use cutting tool supports of the present invention with a wide variety of cutting guides, including, but not limited to, other types of variable or fixed dovetail jigs, mortise and tenon jigs, sliding dovetail jigs, finger joint jigs, other types of jigs for cutting these or other types of joinery, or other cutting guides.

Figure 5:
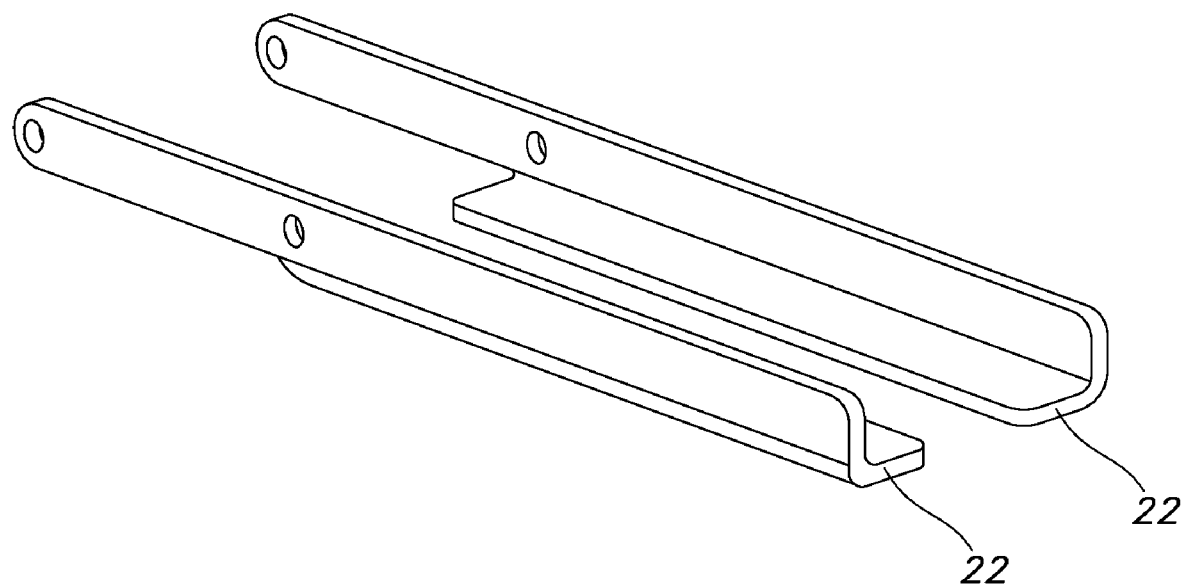
FIG. 5 shows a perspective view of a pair of mounting brackets for use with the cutting guide of FIG. 1

In the embodiment shown in FIGS. 1 and 2, the cutting tool support 10 is secured to the cutting guide 14 by a pair of mounting brackets 22 (also shown in FIG. 5). In some embodiments, mounting brackets 22 may allow one to retrofit an older cutting guide to be used with a cutting tool support 10. In such embodiments, it may be important to mount the mounting brackets 22 with respect to the cutting guide 14 such that at least a portion of the support surfaces of the cutting tool support 10 (discussed further below) will be substantially co-planar with at least a portion of the support surface or surfaces 20 of the cutting guide when the cutting tool support 10 is secured to brackets 22. In other embodiments, however, cutting guide 14 may be manufactured to include the mounting brackets 22 or may otherwise be useable with cutting tool supports 10 of the present invention. Indeed, in some embodiments, cutting tool support 10 may be an integral part of cutting guide 14.

The cutting tool support 10 shown in the Figures includes: an elongated stabilizer 24 including a support surface 26 at least a portion of which helps to support the cutting tool 12; a dust collector 28 mounted to the stabilizer 24 such that the dust collector 28 can move along the stabilizer 24; and a pair of arms 30 that extend from the dust collector 28, and, in use, at least temporarily interact with the cutting tool 12 such that the dust collector 28 moves to remain proximate to the cutting tool 12 as the cutting tool 12 moves.

Figure 3:
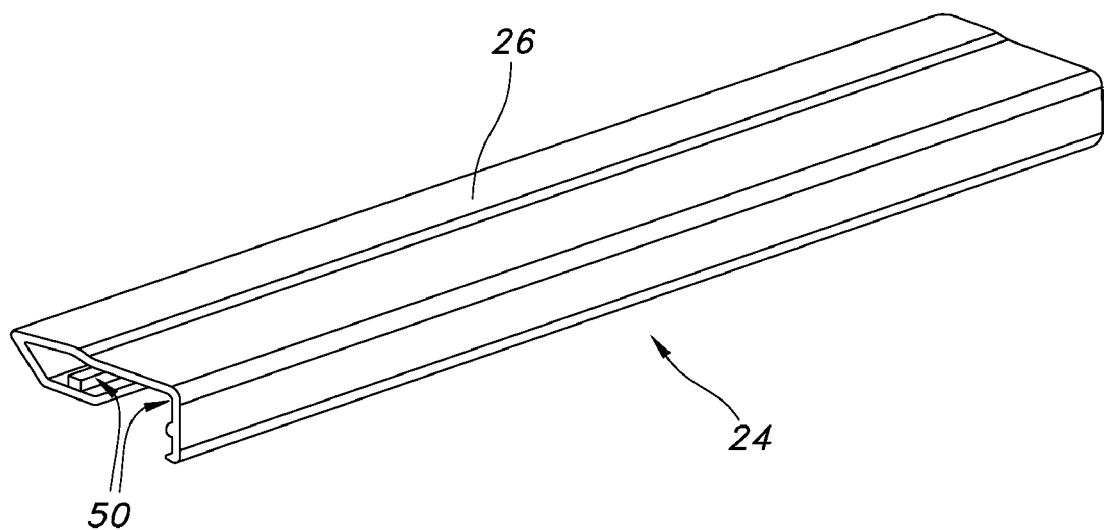
FIG. 3 shows a perspective view of a portion of an elongated stabilizer of the cutting tool support of FIG. 1.

FIG. 3 shows a portion of the elongated stabilizer 24. In the embodiment shown, the portion of elongated stabilizer 24 is extruded aluminum, although it may be formed from other materials and in other manners in other embodiments. Elongated stabilizer 24 may include a support surface 26 that may be substantially co-planar with the support surface 20 of the cutting guide 14 and support, in some embodiments, a rear portion of the cutting tool 12 with respect to the cutting guide 14. In some embodiments, even though the support surface 26 is substantially co-planar with the support surface 20, the support surface 26 may be slightly angled, which may help to ensure that any slight misalignment of the elongated stabilizer 24 with respect to the cutting guide 14 will not cause the edge of the cutting tool to snag on the support surface 26. Additionally, a slightly angled support surface 26 may also minimize the friction as the cutting tool moves along the support surface 26. In some embodiments, only the rear, uppermost edge of the support surface 26 contacts and supports the cutting tool 12.

In the embodiment shown in the Figures, elongated stabilizer 24 is positioned to interact with a rear portion of the cutting tool 12 and the support surfaces 20 of the cutting guide 14 support a forward portion of the cutting tool 12, such that the cutter of the cutting tool 12 is generally located between the two supports. Supporting both forward and rear portions of a cutting tool, in some embodiments, may provide more stability to the cutting tool than just supporting forward portions of the cutting tool. In other embodiments, however, the elongated stabilizer 24 or other component of cutting tool support 10 may be positioned in other arrangements to help support cutting tool 12.

In some embodiments, elongated stabilizer 24 may allow a user to "park" the cutting tool 12 out of the way when not in use (while still resting on the cutting guide 14 and elongated stabilizer 24) such that the user can adjust the cutting guide 14, work-piece, or engage in other activities while the cutting tool 12 remains easily accessible. In some embodiments, front edges of elongated stabilizer 24 may contact a guide bush of the cutting tool 12 to prevent cutting tool 12 from being moved in a manner that would bring the cutter of cutting tool 12 into contact with the elongated stabilizer 24.

Figure 4:
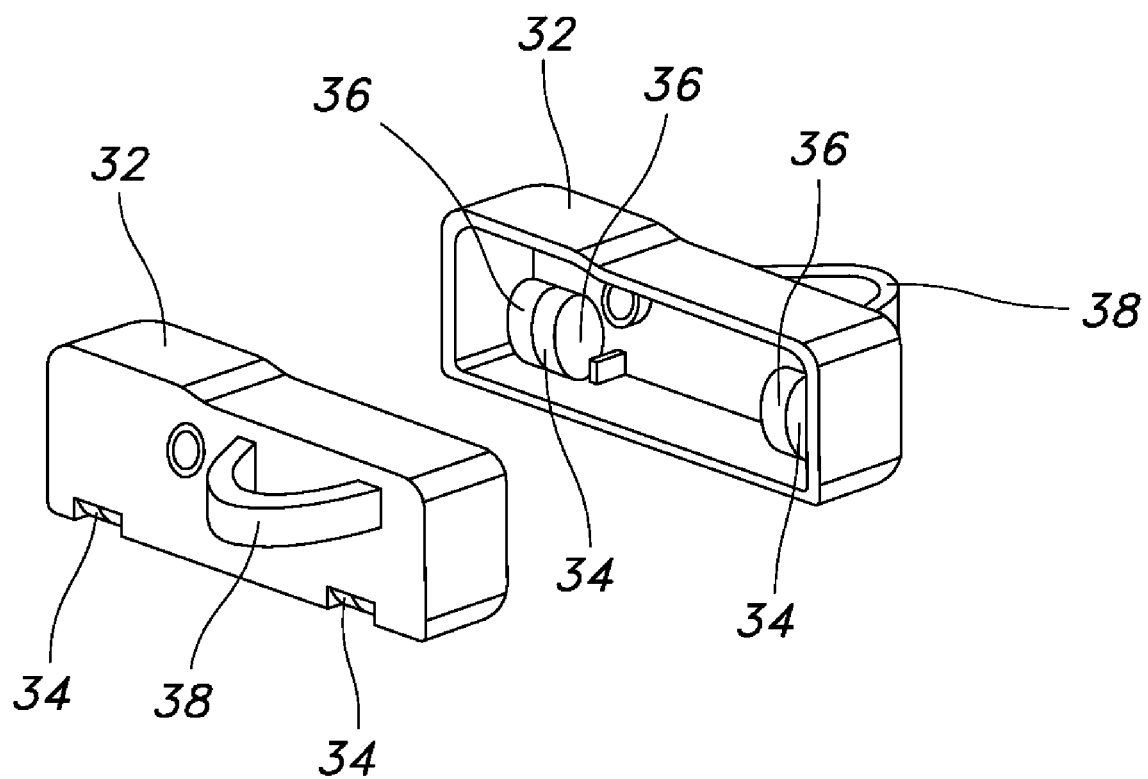
FIG. 4 shows a perspective view of end caps for use with the elongated stabilizer of FIG. 3.

The elongated stabilizer 24 shown in FIGS. 1 and 2 also includes end caps 32, which may facilitate securing the elongated stabilizer 24 to the cutting guide 14, as is discussed further below, and may also include a hanger 38 for facilitating storing the cutting tool support 10 out of the way when not secured to the cutting guide. FIG. 4 shows end caps 32 removed from the rest of the elongated stabilizer 24, although, in other embodiments, ends caps 32 may be integral with the rest of elongated stabilizer 24 or may not even be necessary at all. In the embodiment shown in the figures, end caps 32 are plastic and are secured to the rest of elongated stabilizer 24 by screws.

In the embodiment shown in the Figures, the elongated stabilizer 24 is secured to cutting guide 14 in a removable fashion. In some embodiments, it may be desirable to be able to quickly remove the cutting tool support 10 from the cutting guide 14 for setting-up or adjusting the cutting guide 14, or for other reasons, although in other embodiments it may not be important or necessary to be able to remove the cutting tool support 10 from the cutting guide.

In the embodiment of the Figures, the end caps 32 include rare-earth magnets 34 that secure elongated stabilizer 24 to the metal (including, but not limited to, steel) mounting brackets 22 in a removable fashion. As shown in FIG. 4, the rare earth magnets 34 extend vertically through slots in end caps 32. As also shown in FIG. 4, each rare earth magnet is flanked by two metal disks 36 that may increase the attractive force of the magnets. In some embodiments, it may be desirable to optimize the number of magnets used or otherwise optimize the attractive force between the elongated stabilizer 24 and the mounting brackets 22 to ensure that the elongated stabilizer 24 will be securely held on mounting brackets 22 during use, but can be relatively easily removed when desired as well. In one particular embodiment, the left side end cap 32 may include two rare earth magnets and the right side end cap 32 may include one rare earth magnet. In this embodiment, the use of two magnets on one end cap 32 and only one on the other end cap 32 may help prevent the elongated stabilizer 24 from rocking. In other embodiments, clamps, screws, cotter-pins, bolts, other types of fasteners, slots, flanges, or other devices or structures may be used to secure an elongated stabilizer 24 with respect to a cutting guide 14 in a removable or non-removable fashion.

Figure 6:
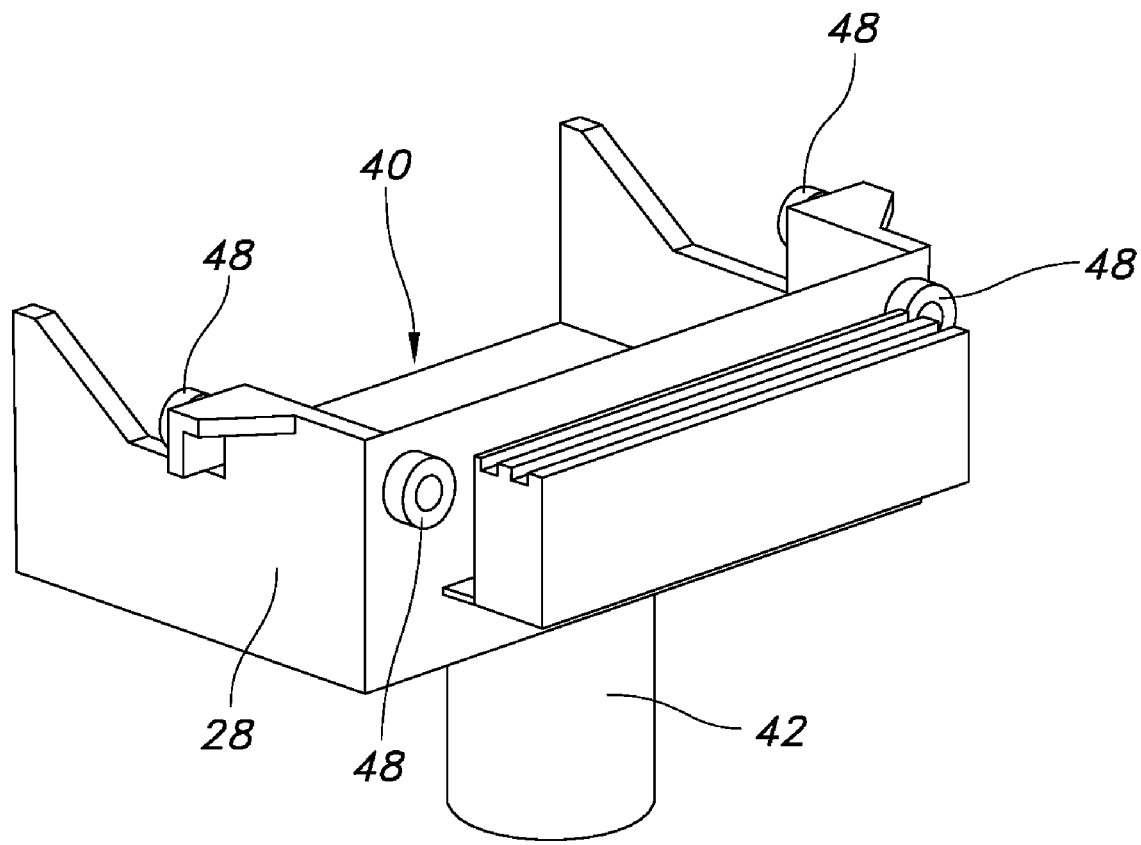
FIG. 6 shows a perspective view of a dust collector for use with the cutting tool support of FIG. 1.
Figure 7:
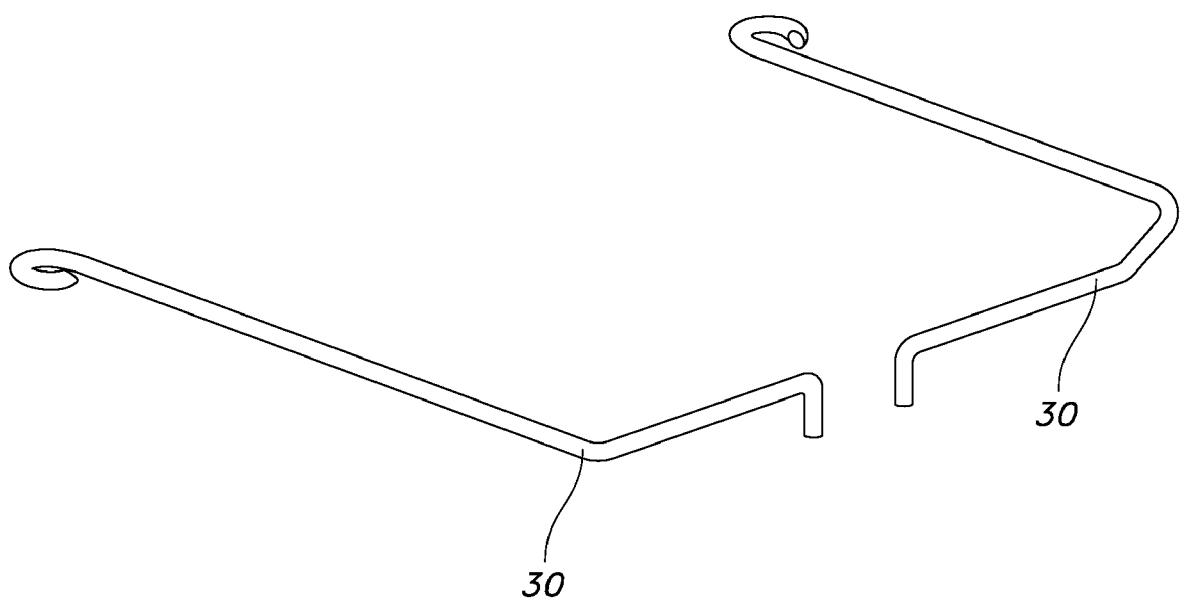
FIG. 7 shows a perspective view of a pair of arms for use with the dust collector of FIG. 6.

The cutting tool support 10 shown in FIGS. 1 and 2 includes a dust collector 28 mounted to the stabilizer 24. FIG. 6 shows the dust collector 28 of FIGS. 1 and 2 removed from the stabilizer 24. As shown, upper portions of the dust collector 28 may have a shape corresponding to the underside of elongated stabilizer 24, such that, in use, the dust collector 28 and elongated stabilizer 24 define a cavity with an opening positioned proximate a cutter of the cutting tool 12 to collect dust and debris created during the cutting process. In other embodiments, however, it is not necessary that the dust collector 28 and elongated stabilizer 24 have corresponding shapes, and dust collector 28 may define (either by itself or in combination with other structures) a cavity for dust collection.

The dust collector 28 shown in FIG. 6 includes a nozzle 42 that can receive a flexible hose (such as the flexible hose 44 shown in FIG. 1) or other component of a vacuum system for creating a negative pressure inside the cavity of the dust collector to collect the dust and other debris created during the cutting process. As shown in FIG. 1, the nozzle 42 may be associated with an adaptor 46 that may facilitate attaching hoses of different sizes to nozzle 42. In other embodiments, it may not be necessary to attach a hose to dust collector 28 and cutting tool support 10 may be used with other systems for collecting dust and debris or may even be used without any type of vacuum or other system.

In the embodiment illustrated by the Figures, dust collector 28 is mounted to the elongated stabilizer 24 such that the dust collector 28 can move along the elongated stabilizer 24 in use. The dust collector 28 may include a number of rollers 48 that fit into channels 50 on elongated stabilizer 24 for facilitating the movement of the dust collector 28 along the stabilizer 24, such as is shown in the embodiment of the Figures, or, in other embodiments, the dust collector 28 and/or elongated stabilizer 24 may be mounted to one another in other manners that allow the dust collector 28 to move along the stabilizer 24. For instance, in some embodiments, at least one of the dust collector 28 and stabilizer 24 may include a flange, rib, or other structure that cooperates with a groove, channel or other structure on the other of the dust collector 28 or stabilizer 24 to allow the dust collector 28 to slide with respect to the stabilizer 24. In still other embodiments, portions of the dust collector 28 may rest on top of the stabilizer 24, but still be able to move with respect to stabilizer 24.

In use, in some embodiments, movement of the cutting tool 12 along the stabilizer 24 may cause the dust collector 28 to move along with it. In the embodiment shown in the Figures, the dust collector 28 includes arms 30 that may interact with the cutting tool 12 as the cutting tool 12 moves along the stabilizer 24, keeping the dust collector 28 close to the cutter 12 during use. In this particular embodiment, the arms 30 are bent metal wire that extend on either side of the cutting tool 12, such that as the cutting tool 12 moves to the left, the left arm 30 will contact the base of the cutting tool 12, causing the dust collector 28 to move to the left along with the cutting tool 12. Similarly, in the particular embodiment shown, when the cutting tool 12 moves to the right along the stabilizer 24, the right arm 30 will contact the base of the cutting tool 12, causing the dust collector 28 to move to the right along with the cutting tool 12.

In the embodiment shown in the Figures, the width of the area between the arms 30 is adjustable by positioning the arms 30 in slots formed in a rear portion of dust collector 28, although, in other embodiments, the width between arms 30 may be adjustable in other manners, or may not be adjustable at all.

In the embodiment shown in the Figures, and in particular FIG. 2, the cutting tool 12 does not necessarily contact both arms 30 during use, and the arms may be sufficiently spaced such that one may position the cutting tool 12 between the two arms 30 without contacting either arm 30. Such an arrangement may be desirable in some embodiments, allowing the cutting tool to be quickly positioned on, and removed from, the cutting guide 14 and cutting tool support 10. In other embodiments, arms 30 may be spaced to directly contact cutting tool 12 at all times when the cutting tool 12 is positioned on stabilizer 24. In still other embodiments, arms 30 may not be necessary and other structures may be utilized such that the cutting tool interacts with the dust collector 28 allowing the dust collector 28 to move to remain proximate to the cutter. In some embodiments, dust collector 28 may be directly attached to cutting tool 12 when the cutting tool 12 is positioned on the support 10.

In one example of a method of using the embodiment of the cutting tool support 10 shown in the Figures, one may first position a work-piece for cutting in the cutting guide 14. Next, the cutting tool support 10 may be positioned on the mounting brackets 22, the flexible hose 44 may be attached to the nozzle 42 of dust collector 28, and a vacuum system associated with flexible hose 44 may be turned on. Subsequently, cutting tool 12 may be positioned on stabilizer 24 between arms 30 and cutting tool 12 may be switched on. Finally, cutting tool 12 may be moved along stabilizer 24 and guided by guide fingers 16 of cutting guide 14 to cut joint elements in the work-piece, with the arms 30 of the dust collector 28 interacting with cutting tool 12 to maintain the dust collector 28 proximate to the cutter of cutting tool 12. This is just one example of a method of using one embodiment of a cutting tool support, and is not intended to limit the scope of the present invention.

Additions, changes, deletions and other modifications may be made to the above described embodiment without departing from the scope or spirit of the present invention.

The invention claimed is:

1. An apparatus for at least partially supporting a cutting tool with respect to a cutting guide, comprising:
   (a) an elongated stabilizer comprising a support surface, at least a portion of the support surface at least partially supporting the movement of a cutting tool with respect to a cutting guide; and
   (b) a dust collector mounted to the stabilizer such that the dust collector can move along the stabilizer;
   wherein, in use, the dust collector at least temporarily interacts with the cutting tool such that the dust collector moves to remain proximate to the cutting tool as the cutting tool moves along a length of the cutting guide, and wherein, in use, the dust collector does not move along a width of the cutting guide as the cutting tool moves along a width of the cutting guide.

2. The apparatus of claim 1, further comprising at least one arm extending from the dust collector to, when in use, at least temporarily interact with the cutting tool such that the dust collector moves to remain proximate to the cutting tool as the cutting tool moves with respect to the cutting guide.

3. The apparatus of claim 1, further comprising at least two arms extending from the dust collector to, when in use, at least temporarily interact with substantially opposing sides of the cutting tool such that the dust collector moves to remain proximate to the cutting tool as the cutting tool moves with respect to the cutting guide.

4. The apparatus of claim 3, wherein the at least two arms are adjustable to alter a distance between the two arms.

5. The apparatus of claim 3, wherein, in use, at least one of the at least two arms is at least temporarily spaced from the cutting tool.

6. The apparatus of claim 1, wherein a lower surface of the stabilizer substantially covers an at least partially open upper portion of the dust collector.

7. The apparatus of claim 6, wherein the dust collector comprises at least one roller that interacts with at least one channel formed in the stabilizer.

8. An apparatus for guiding the movements of a cutting tool with respect to a work-piece, comprising:
 (a) a cutting guide, comprising:
  (i) a first support surface, at least a portion of the first support surface at least partially supporting the movement of a cutting tool; and
  (ii) at least one guide surface for at least partially guiding the movement of the cutting tool;
 (b) a stabilizer, the stabilizer comprising a second support surface, at least a portion of the second support surface at least partially supporting the movement of the cutting tool; and
 (c) a dust collector mounted to the stabilizer such that the dust collector can move along the stabilizer;
wherein, in use, the dust collector at least temporarily interacts with the cutting tool such that the dust collector moves to remain proximate to the cutting tool as the cutting tool moves along the length of the cutting guide, and wherein, in use, the dust collector does not move along a width of the cutting guide as the cutting tool moves along a width of the cutting guide.

9. The apparatus of claim 8, wherein, in use, a cutter of the cutting tool is positioned in an area between at least portions of the first support surface of the cutting guide and the second support surface of the stabilizer.

10. The apparatus of claim 9, wherein the cutting guide further comprises at least one mounting bracket; and wherein the stabilizer is secured to the at least one mounting bracket.

11. The apparatus of claim 10, wherein the stabilizer is secured to the at least one mounting bracket in a removable fashion.

12. The apparatus of claim 11, wherein the stabilizer comprises at least one magnet that facilitates securing the stabilizer to the at least one mounting bracket in a removable fashion.

13. The apparatus of claim 10, wherein the stabilizer is secured to the at least one mounting bracket such that at least a portion of the first support surface of the cutting guide and at least a portion of the second support surface of the stabilizer are substantially co-planar.

14. The apparatus of claim 8, wherein the cutting guide is a cutting guide for use with a router.

15. The apparatus of claim 14, wherein the cutting guide is a dovetail jig.

* * * * *